United States Patent
Kawai et al.

[11] Patent Number: 5,770,334
[45] Date of Patent: Jun. 23, 1998

[54] CRACK-PROOF-STRUCTURED BATTERY

[75] Inventors: Motohiro Kawai; Fumikazu Isogai; Kyoichi Kinoshita; Hirohisa Shojima; Shinya Sawada, all of Aichi, Japan

[73] Assignee: Kabushiki Kaisha Toyoda Jidoshokki Seisakusho, Kariya, Japan

[21] Appl. No.: 638,767

[22] Filed: Apr. 29, 1996

[30] Foreign Application Priority Data

May 1, 1995 [JP] Japan .................................. 7-107561
Jan. 29, 1996 [JP] Japan .................................. 8-012630

[51] Int. Cl.⁶ .................................................. H01M 2/26
[52] U.S. Cl. .................................... 429/211; 429/623.4
[58] Field of Search ............................. 429/161, 211; 29/623.2, 623.4

[56] References Cited

U.S. PATENT DOCUMENTS 4,119,771 10/1978 Saridakis ........................... 429/211 X
5,098,802 3/1992 Kainoh ............................. 429/211 X
5,246,797 9/1993 Imhof et al. ........................... 429/211

*Primary Examiner*—Stephen Kalafut
*Attorney, Agent, or Firm*—Brooks Haidt Haffner & Delahunty

[57] ABSTRACT

A nickel-hydrogen battery is designed to have, in its battery container, electrode plates welded and connected onto a lead conductor. With the configuration, the edge of the end portion of the lead conductor welded onto the electrode plate can be formed as a combination of concave and convex portions. The stresses on the electrode plate and lead conductor are concentrated on the edge of the end portion onto which the electrode plate and lead conductor are welded and where a crack may arise. However, shaping into waveform the edge of the end portion where the lead conductor is welded onto the electrode plate makes the edge of the end portion long enough to reduce the concentration of the stresses. Furthermore, even if the crack may have arisen, the development of the crack can be reduced by making the crack development direction different from the direction of the edge of the lead conductor because the edge of the end portion of the lead conductor is shaped into waveform.

21 Claims, 20 Drawing Sheets

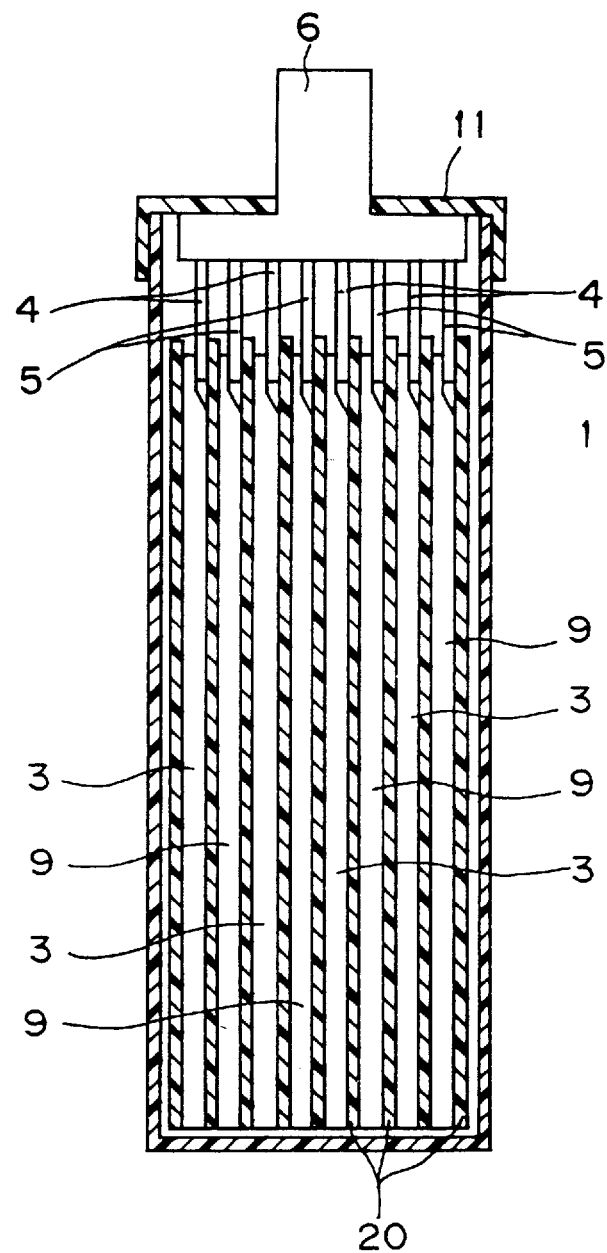
F I G. 4

CRACK-PROOF-STRUCTURED BATTERY

BACKGROUND OF THE INVENTION

1. Field of the Invention

The present invention relates to a battery, and more specifically to a lead conductor connecting an electrode with an external terminal, and to the connection between the electrode and the lead conductor.

2. Description of the Related Art

FIG. 1 is a sectional view showing the conventional laminated secondary battery. FIG. 2 is a sectional view showing the thickness of the welded portion between a negative plate 300 as an electrode and a lead conductor 400. A battery container 100 stores an electrode set 200. The electrode set 200 comprises positive plates (not shown in FIG. 2) as an electrode and the negative plates 300 laminated with separators as sheets of porous films (not shown in FIG. 2) inserted between the positive and negative plates; a lead conductor 400 in the form of a sheet whose bottom portion is welded to the top portion of the negative plate 300; and a lead conductor 500 in the form of a sheet whose bottom portion is welded to the top portion of the positive plate. An external negative pole terminal 600 is connected to the top portion of the lead conductor 400, and an external positive pole terminal 700 is connected to the top portion of the lead conductor 500. A welded portion 800 shown in FIG. 2 is formed by welding the lead conductor 400 and the negative plate 300 with their contact areas completely welded by a seam welding method, etc. Likewise, the contact surfaces between the lead conductor 500 and the positive plate are welded although not shown in FIG. 2. The negative plate 300 can be produced by, for example, filling a porous foam nickel with hydrogen-occluding alloy powder, and then by compressing it into a proper form. The positive plate can be produced by, for example, filling a porous foam nickel with nickel hydroxide powder, and then by compressing it into a proper form.

However, since it is necessary to produce the electrodes with soft and porous metal that has a large reaction area and is permeable for gas and liquid, the stress is concentrated on an on-line area 301 of the negative plate 300 touching a lower edge 401 of the lead conductor 400 forming the lower edge of the welded portion 800 according to the structure of the conventional battery as shown in FIG. 2. Thus, a crack C may arise along the on-line area 301. This also holds true with the positive plate.

Described below in detail is the process of generating a crack.

For convenience, only the negative plate 300 is explained and the description of the positive plate is omitted here. However, the crack-generating process in the positive plate is the same as that in the negative plate.

The battery assembly process is performed in the following procedure. First, electric poles are bound together into the electrode set 200, and the electrode set 200 is stored in the top-open battery container 100. Then, the lead conductor 400 is welded onto the terminal 600. The battery container 100 is filled with electrolytic solution, and a cover 101 is put on the battery container 100. Next, the cover 101 is thermally connected to the battery container 100, and an activating process is performed. At this time, the lead conductor 400 is pushed down and bent by the external negative pole terminal 600 which is pressed by the cover 101, thereby generating a compression stress in the conductor 400 of the set 200. Compressing the lead conductor 400 by the thermal shrinkage after the lead conductor 400 is welded onto the terminal 600 generates a tensile stress. The shearing stress is generated either by the discrepancy when the electrode set 200 is put in the battery container 100 or by the expansion or shrinkage of the hydrogen electrode in the activation process. The bending stress is generated when the lead conductors 400 are bound and welded onto the terminal 600, or when the hydrogen electrode is expanded, shrunk, etc. Thus, since the compression stress (stress in the buckling direction), tensile stress, shearing stress, bending stress, etc. are concentrated on the on-line area 301 (FIG. 2) of the negative plate 300 depending on the bending state of the lead conductor 400, the crack C arises in the on-line area 301. The generated crack C is developed along the on-line area 301 by the stress from the expansion or shrinkage of both electrodes in repeatedly charging and discharging the battery. Even if no cracks arise during the assembly of the cover 101, they may be generated and developed in the above described charging and discharging processes. As a result, a cracked and stripped portion may break the adjacent separator and short-circuit the counter electrode, and the crack may cross the electrode and disconnect the lines.

SUMMARY OF THE INVENTION

The present invention has been developed to solve the above described problems and aims at preventing a crack from being generated or developed in the on-line area of an electrode plate along the edge of the welded portion between the lead conductor and electrode plate, and at providing a battery capable of preventing the crack from being generated or developed.

To attain the above described objects of the present invention, the battery according to the first configuration of the present invention comprises an electrode plate and a lead conductor plate connected to an external terminal and welded at its end onto one edge of the electrode. The length of the edge of the end portion of the lead conductor is formed such that it is longer than the shortest distance between both sides of the lead conductor.

Since the length of the edge of the end portion is longer than the shortest line between both sides at the end portion of the lead conductor, the length of the on-line area is longer. Since the stress in the normal direction to the tangent at a point on the on-line area along the edge of the end portion of the lead conductor can be expressed by the cosine component of the stress on the on-line area when the edge of the end portion of the lead conductor is equal to the above described shortest line, the stress can be smaller than that obtained when the edge of the end portion of the lead conductor equals the shortest line.

The battery according to the second configuration of the present invention comprises an electrode plate and a lead conductor plate connected to an external terminal and welded at its end onto one edge of the electrode. The length of the edge of the end portion of the welded area between the lead conductor and the electrode plate is formed such that it is longer than the shortest distance between both sides of the lead conductor at the welded area.

According to the second configuration, since the length of the edge of the end portion at the welded area between the lead conductor and electrode plate is longer than the shortest line between both sides at the end portion of the lead conductor, the length of the on-line area can be made long as described above. Since the stress in the normal direction to the tangent at a point on an on-line area along the edge of the end portion of the welded area can be expressed by the cosine component of the stress on the on-line area when the edge of the end portion of the welded area is equal to the above described shortest line, the stress can be smaller than that obtained when the edge of the end portion of the welded area equals the shortest line.

With the first configuration, all or a part of the edge of the end portion of the lead conductor is formed with a concave or convex shape.

Since all or a part of the edge of the end portion of the lead conductor is formed with a concave or convex shape, the length of the edge of the end portion is longer than the length of the shortest line between both sides at the end portion of the lead conductor. Therefore, as described above, the length of the on-line area is made long. Since the stress in the normal direction to the tangent at a point on the on-line area along the edge of the end portion of the lead conductor can be expressed by the cosine component of the stress on the on-line area when the edge of the end portion of the lead conductor is equal to the above described shortest line, the stress can be smaller than that obtained when the edge of the end portion of the lead conductor equals the shortest line. Since the edge of the end portion is not linear, the on-line area does not match the crack development direction. Accordingly, even if a crack arises and develops, it never crosses the on-line area.

With the second configuration, all or a part of the edge of the end portion of the welded area is formed with a concave or convex shape.

Since all or a part of the edge of the end portion of the welded area is formed with a concave or convex shape, the length of the edge of the end portion is longer than the length of the shortest line between both sides at the end portion of the lead conductor. Therefore, as described above, the length of the on-line area is made long. Since the stress in the normal direction to the tangent at a point on an on-line area along the edge of the end portion of the lead conductor can be expressed by the cosine component of the stress on the on-line area when the edge of the end portion of the welded area is equal to the above described shortest line, the stress can be smaller than that obtained when the edge of the end portion of the welded area equals the shortest line. Since the edge of the end portion is not linear, the on-line area does not match the crack development direction. Accordingly, even if a crack arises and develops, it never crosses the on-line area.

With the first configuration, all or a part of the edge of the end portion of the lead conductor is formed with a shape having a combination of concave and convex portions.

Since all or a part of the edge of the end portion of the lead conductor is formed with the shape having a combination of concave and convex portions, the length of the edge of the end portion is longer than the length of the shortest line between both sides at the end portion of the lead conductor. Therefore, as described above, the length of the on-line area is made long. Since the stress in the normal direction to the tangent at a point on an on-line area along the edge of the end portion of the lead conductor can be expressed by the cosine component of the stress on the on-line area when the edge of the end portion of the lead conductor is equal to the above described shortest line, the stress can be smaller than that obtained when the edge of the end portion of the lead conductor equals the shortest line. Since the edge of the end portion is not linear, the on-line area does not match the crack development direction. Accordingly, even if a crack arises and develops, it never crosses the on-line area.

With the second configuration, all or a part of the edge of the end portion of the welded area is formed with a shape having a combination of concave and convex portions.

Since all or a part of the edge of the end portion of the welded area is formed with the shape having a combination of concave and convex portions, the length of the edge of the end portion is longer than the length of the shortest line between both sides at the end portion of the lead conductor. Therefore, as described above, the length of the on-line area is made long. Since the stress in the normal direction to the tangent at a point on the on-line area along the edge of the end portion of the lead conductor can be expressed by the cosine component of the stress on the on-line area when the edge of the end portion of the welded area is equal to the above described shortest line, the stress can be smaller than that obtained when the edge of the end portion of the welded area equals the shortest line. Since the edge of the end portion is not linear, the on-line area does not match the crack development direction. Accordingly, even if a crack arises and develops, it never crosses the on-line area.

According to the present invention, the electrode plate comprises a positive plate and a negative plate. The negative plate is mainly made of a porous material including a hydrogen-occluding alloy.

Since the electrode plate comprises a positive plate and a negative plate, and the negative plate is mainly made of a porous material including a hydrogen-occluding alloy, an effective crack-proof method can be realized even if the plate is made of a fragile porous material according to the present invention.

BRIEF DESCRIPTION OF THE DRAWINGS

FIG. 4 is a sectional view showing the battery shown in FIG. 3;

DESCRIPTION OF THE PREFERRED EMBODIMENTS

Embodiments of a nickel hydrogen battery according to the present invention (hereinafter referred to simply as a battery) are described below in detail by referring to the attached drawings.

Figure 1:
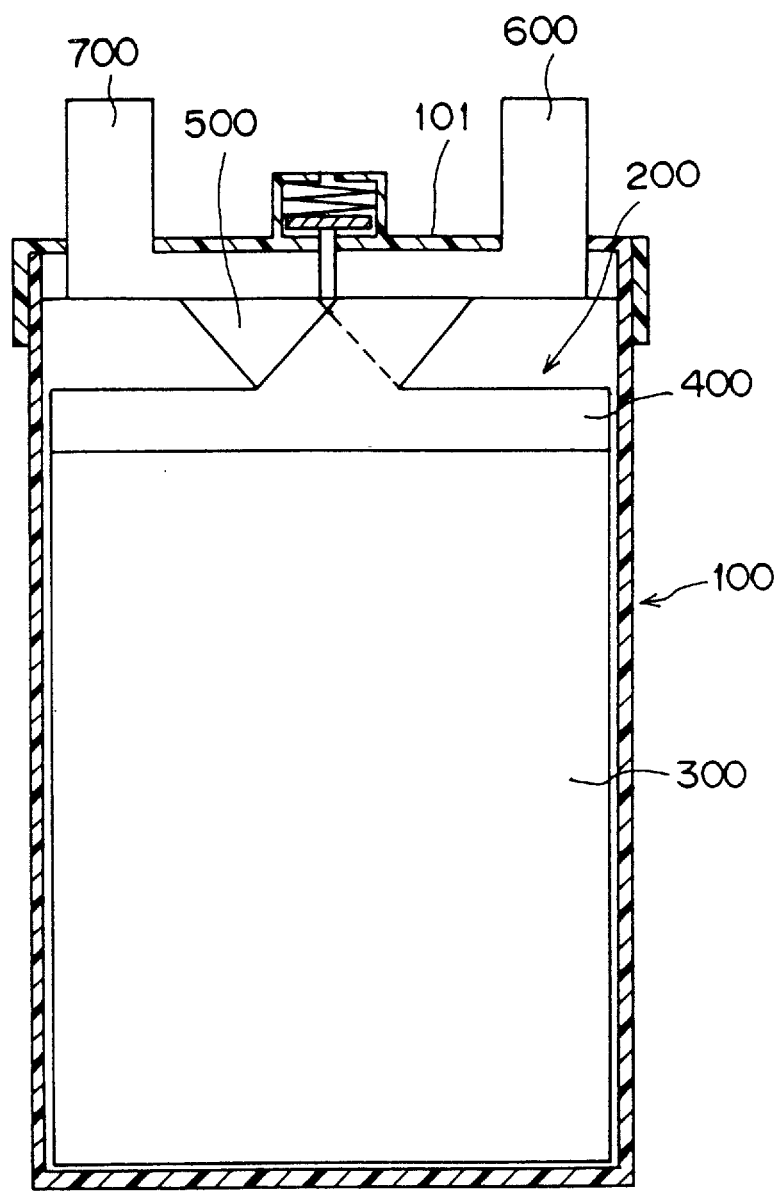
FIG. 1 is a sectional view of the electrode showing a configuration of a conventional battery.
Figure 2:
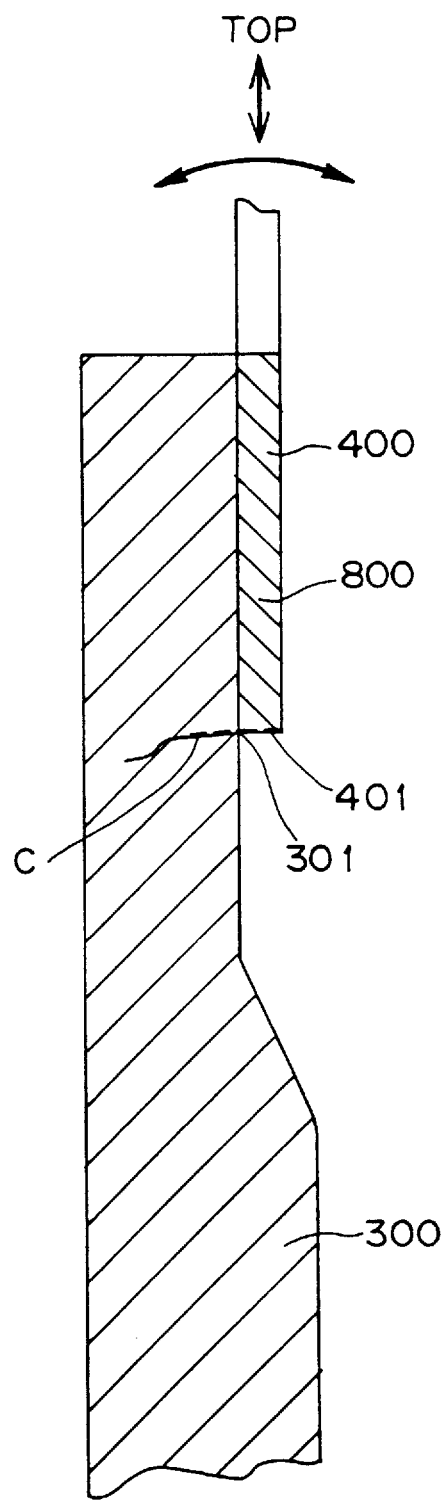
FIG. 2 is a sectional view of the welded portion between the negative plate 300 and lead conductor 400 shown in FIG. 1.
Figure 3:
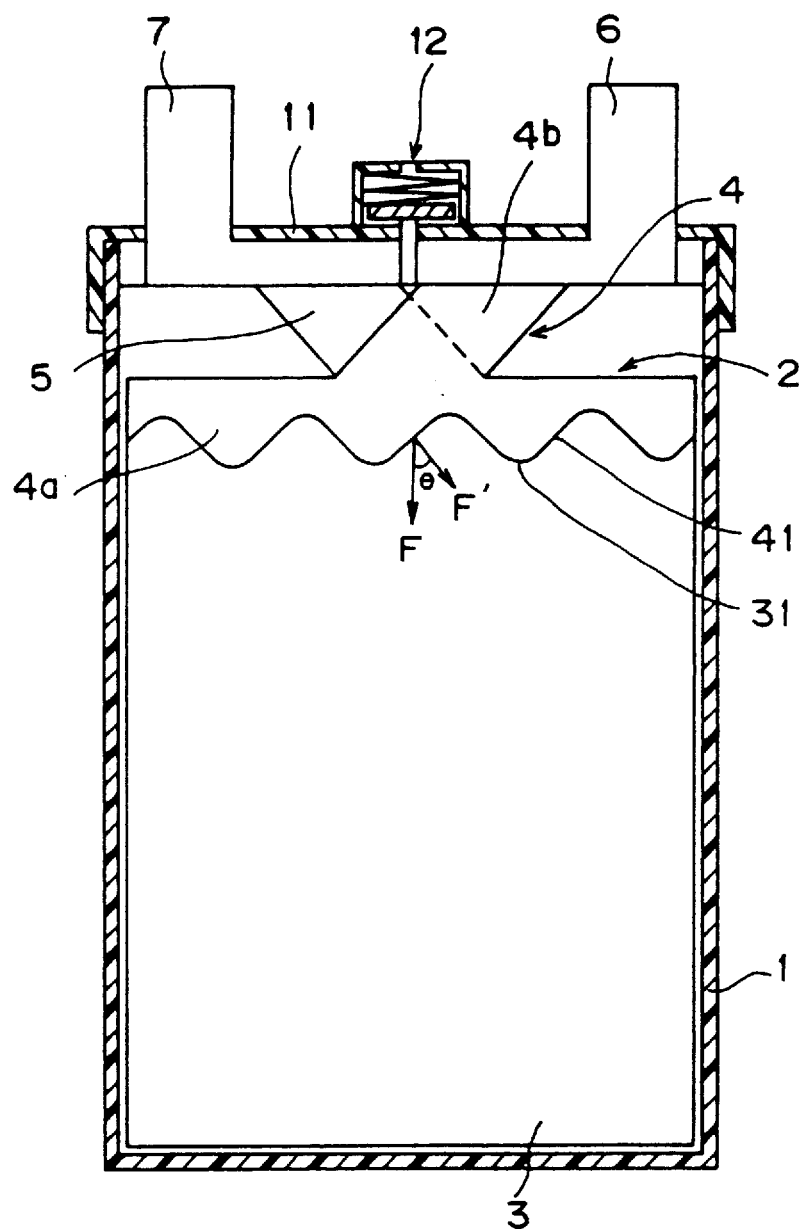
FIG. 3 is a sectional view of the electrode showing an embodiment of a battery according to the present invention.
Figure 5:
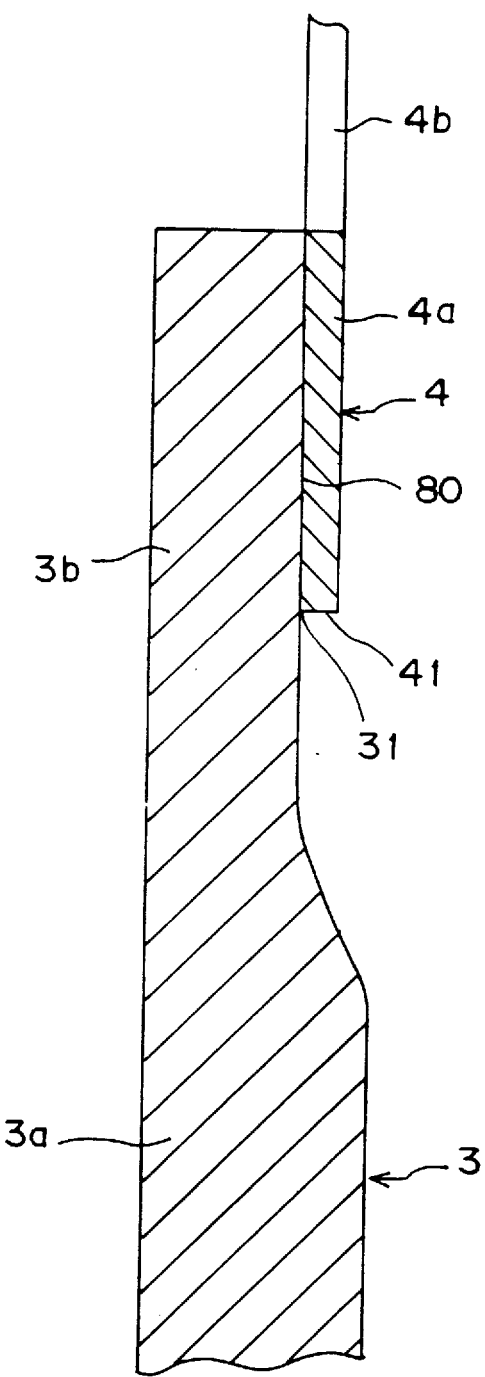
FIG. 5 is an enlarged sectional view showing the welded portion between a negative plate 3 and a lead conductor 4.

As shown in FIGS. 3 through 5, the battery comprises a battery container 1 containing an electrode set 2. The electrode set 2 comprises the negative plates 3 and positive plates 9 as electrode plates laminated with separators 20 (FIG. 4) as porous films inserted between the negative and positive plates; sheet-form the lead conductors 4 whose lower edges are welded onto the upper edges of the negative plate 3; and sheet-form lead conductors 5 whose lower edges are welded onto the upper edges of the positive plates 9. An external negative pole terminal 6 is connected to the upper edges of the lead conductors 4. An external positive pole terminal 7 is connected to the upper edges of the lead conductors 5. As described later, both positive plates 9 and negative plates 3 are made of foam nickel plates.

FIG. 5 is an enlarged sectional view showing the welded portion between the negative plate 3 and lead conductor 4.

The negative plate 3 comprises a reacting portion 3a and a joint portion 3b obtained by vertically compressing the upper edge of the reacting portion 3a. The lead conductor 4 comprises a joint portion 4a as an edge connected to the joint portion 3b and a lead portion 4b designed as obliquely protruding from a point of the upper edge of the joint portion 4a. As shown in FIGS. 3 and 4, the upper edge of the lead portion 4b is welded onto the external negative pole terminal 6. A lower edge 41 of the lead conductor is shaped as a combination of concave and convex portions as shown in FIG. 3. The contact area between the joint portions 3b and 4a is totally joined by the seam welding method to form a welded area 80.

The negative plate 3 can be a porous foam nickel material compressed after being filled with hydrogen-occluding alloy powder. The positive plate 9 can be a sheet of porous foam nickel material compressed after being filled with nickel hydroxide powder, etc. The lead conductors 4 and 5 can be copper metallized with nickel.

The positive plate 9 and lead conductor 5 are welded as with the negative plate 3 and lead conductor 4, and the descriptions are omitted here. The following descriptions center around the negative plate 3 and lead conductor 4, and the descriptions of the positive plate 9 and lead conductor 5 are omitted.

According to the embodiment, the thickness of the positive plate 9 and negative plate 3 is about 0.8 mm at the reacting portion, and 0.5–0.7 mm at the joint portion. The thickness of the lead conductors 4 and 5 is about 0.2 mm. The separator 20 is made of non-woven polypropylene fabric 0.2 mm thick and 90 mm long. However, these dimensions are applied to the present embodiment only, and it is obvious that the dimensions are not limited to these values.

The battery container 1 is filled with electrolytic solution to soak the negative plate 3, positive plate 9, and separator 20. A resin cover 11 is put on the top aperture of the battery container 1. The cover 11 is provided with a safety valve 12, external negative pole terminal 6, and external positive pole terminal 7.

With the above described configuration, the battery generates a stress in an on-line area 31 at the lower edge of the welded area 80 of the joint portion 3b (FIG. 5) during the assembly of the battery. (The stress also arises in the joint portion of the positive plate 9.)

That is, the electrode set 2 of the battery is pushed down and the lower edges of the negative plate 3 and positive plate 9 touch the bottom inside when the cover 11 is mounted onto the battery container 1 to seal it after the electrode set 2 is stored in the top-open battery container 1. As a result, the lead conductors 4 and 5 are bent, thereby causing the stress in the on-line area 31.

During the charging and discharging of the battery, the negative plate 3 and positive plate 9 are expanded or shrunk, and also generate stress in the on-line area 31.

When the stress arises in the on-line area 31, the stress F' is placed as shown in FIG. 3 in the normal direction to the tangent at a point in the on-line area 31 and is represented by the cosine component FcosO of the stress F applied to the shortest line (horizontal line according to the present embodiment) between both sides of the joint portion 4a. As a result, the stress can be reduced in comparison with the conventional technology in which the length of the lower edge of 41 is equal to the shortest line between both sides of the joint portion 4a of the lead conductor 4.

The concentration of the stresses can be reduced because the lower edge 41 is longer than the shortest line between both sides of the joint portion 4a of the lead conductor 4.

Even if a crack arises, the lower edge 41 is not a straight line and therefore the on-line area 31 does not match the crack development direction. Furthermore, since the stresses on the portions of the linear area 31 are not uniform, they do not simply develop cracks or cross the on-line area 31.

According to the above described embodiment, the lower edge 41 of the lead conductor 4 is formed as a combination of alternate concave and convex portions. The shape of the edge is not limited to that shown in FIG. 3. For example, it can be a combination of alternate concave and convex portions as shown in FIGS. 6 through 10.

Figure 6:
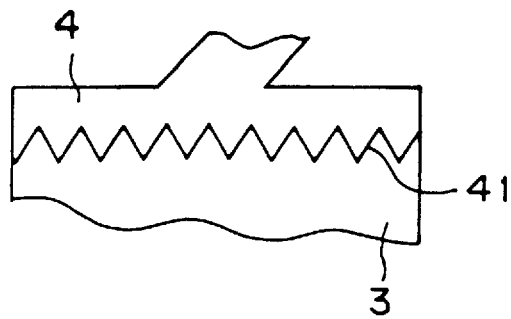
FIG. 6 is a front view showing the variations of the lead conductor 4.
Figure 7:
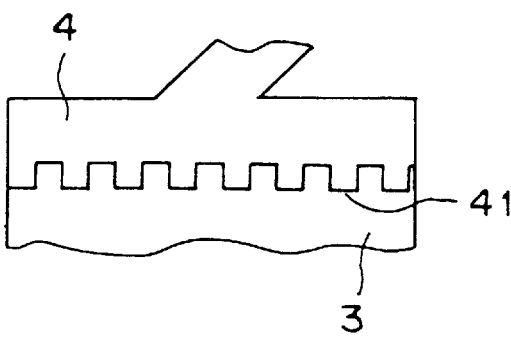
FIG. 7 is a front view showing the variations of the lead conductor 4.
Figure 8:
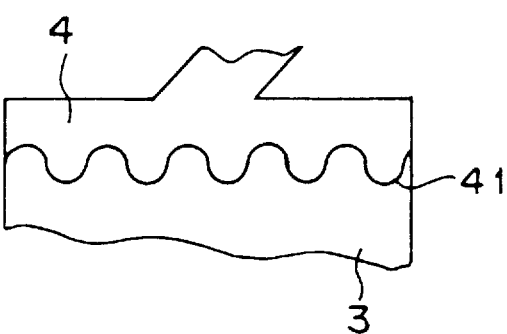
FIG. 8 is a front view showing the variations of the lead conductor 4.
Figure 9:
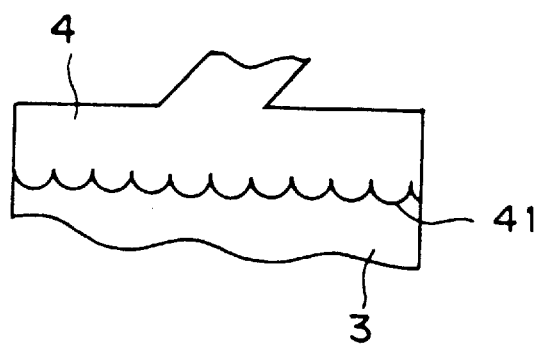
FIG. 9 is a front view showing the variations of the lead conductor 4.
Figure 10:
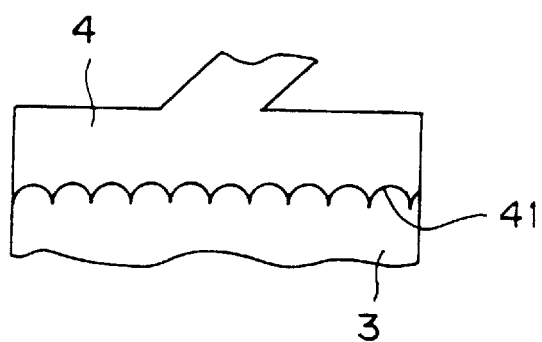
FIG. 10 is a front view showing the variations of the lead conductor 4.
Figure 11:
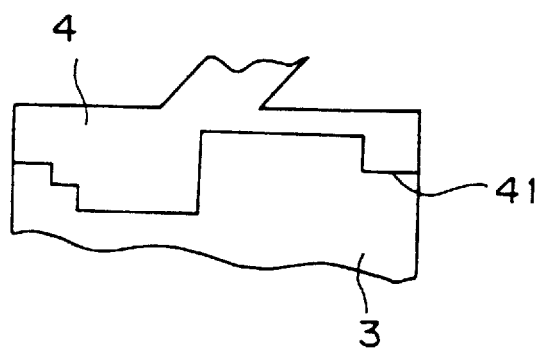
FIG. 11 is a front view showing the variations of the lead conductor 4.
Figure 12:
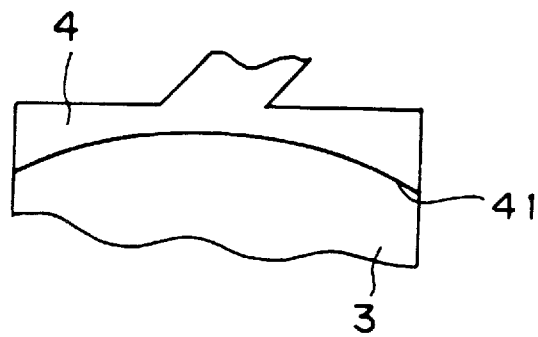
FIG. 12 is a front view showing the variations of the lead conductor 4.
Figure 13:
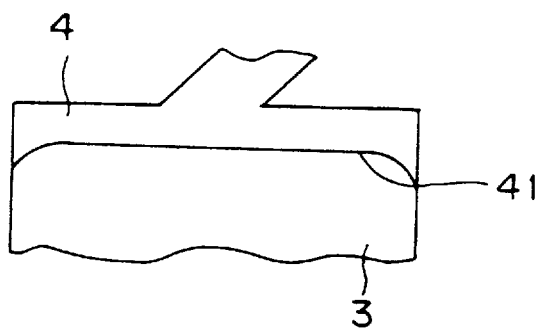
FIG. 13 is a front view showing the variations of the lead conductor 4.
Figure 14:
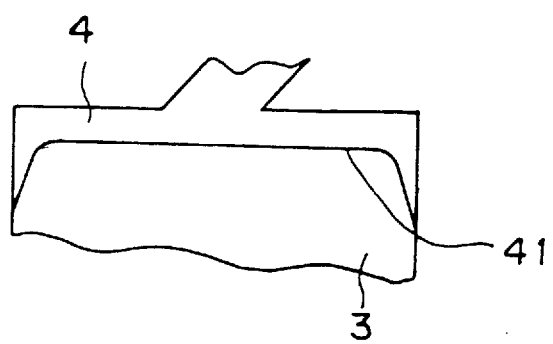
FIG. 14 is a front view showing the variations of the lead conductor 4.
Figure 15:
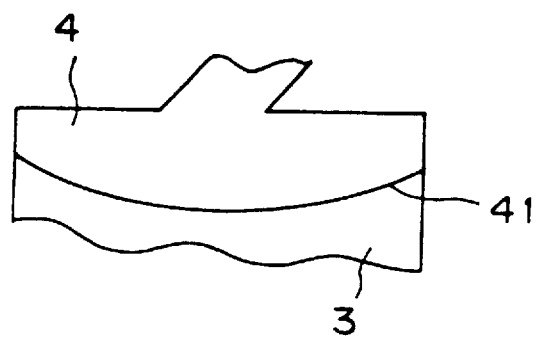
FIG. 15 is a front view showing the variations of the lead conductor 4.
Figure 16:
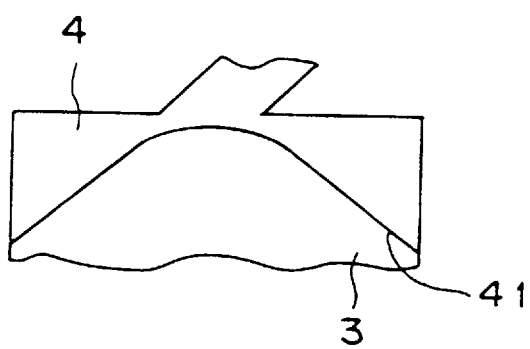
FIG. 16 is a front view showing the variations of the lead conductor 4.
Figure 17:
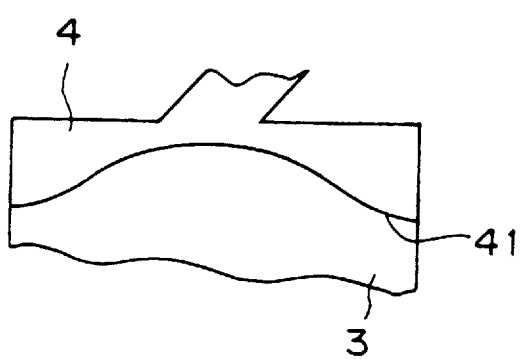
FIG. 17 is a front view showing the variations of the lead conductor 4.
Figure 18:
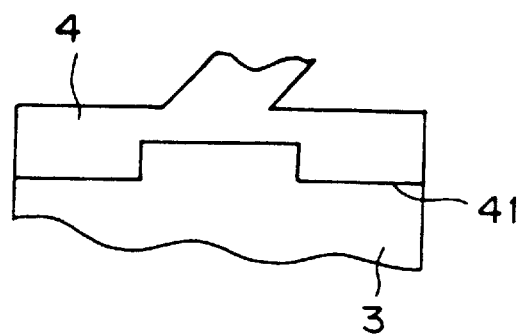
FIG. 18 is a front view showing the variations of the lead conductor 4.
Figure 19:
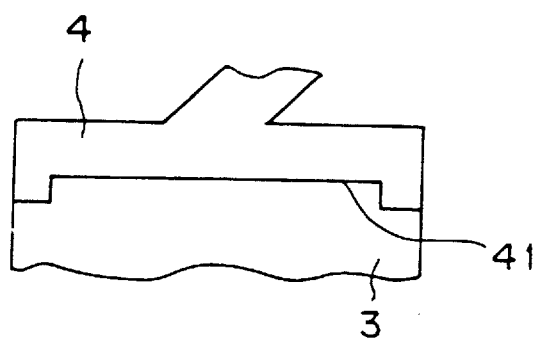
FIG. 19 is a front view showing the variations of the lead conductor 4.
Figure 20:
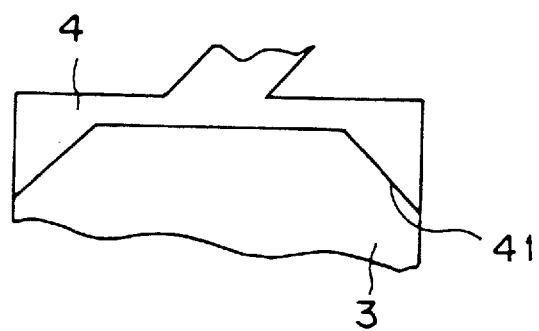
FIG. 20 is a front view showing the variations of the lead conductor 4.
Figure 21:
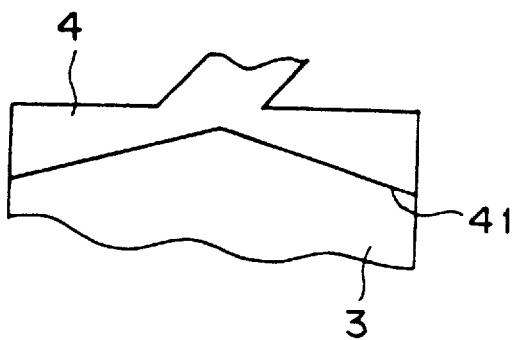
FIG. 21 is a front view showing the variations of the lead conductor 4.
Figure 22:
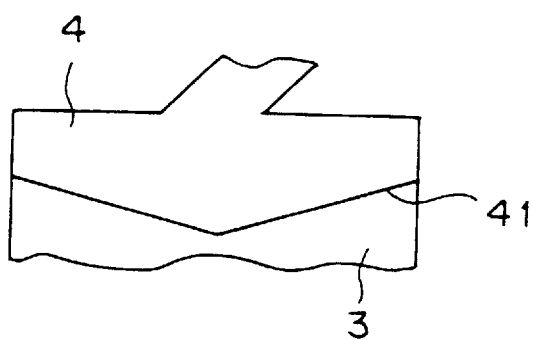
FIG. 22 is a front view showing the variations of the lead conductor 4.
Figure 23:
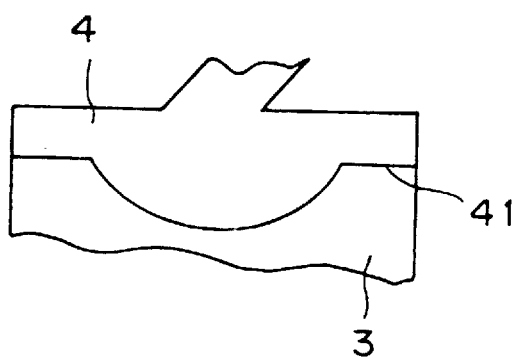
FIG. 23 is a front view showing the variations of the lead conductor 4.
Figure 24:
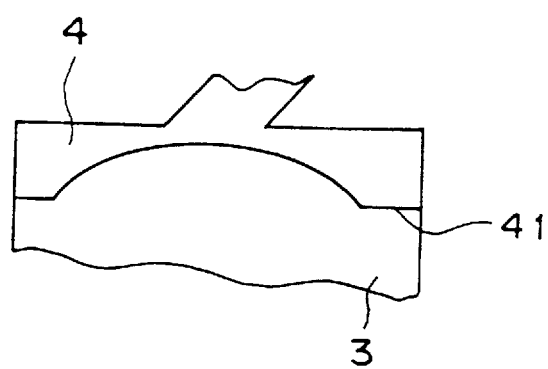
FIG. 24 is a front view showing the variations of the lead conductor 4.
Figure 25:
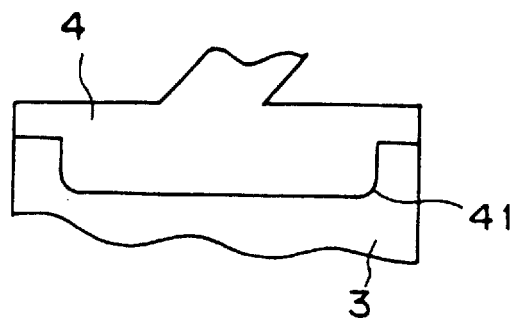
FIG. 25 is a front view showing the variations of the lead conductor 4.
Figure 26:
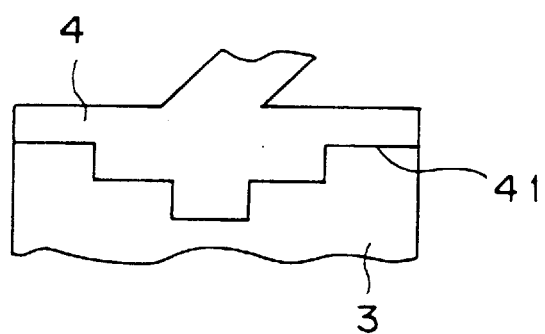
FIG. 26 is a front view showing the variations of the lead conductor 4.
Figure 27:
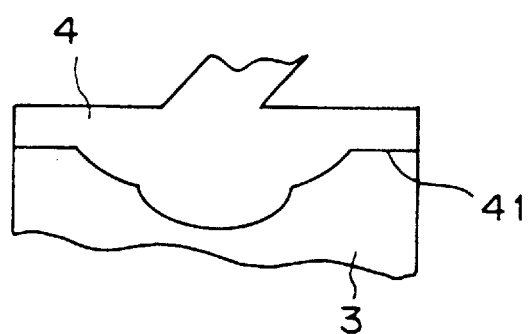
FIG. 27 is a front view showing the variations of the lead conductor 4.
Figure 28:
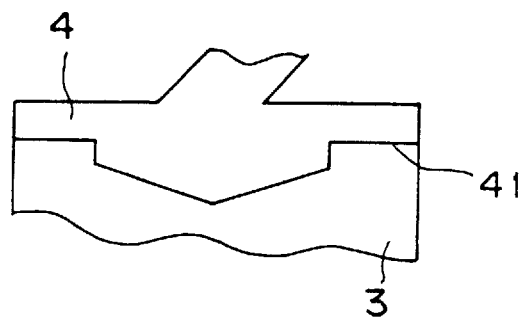
FIG. 28 is a front view showing the variations of the lead conductor 4.
Figure 29:
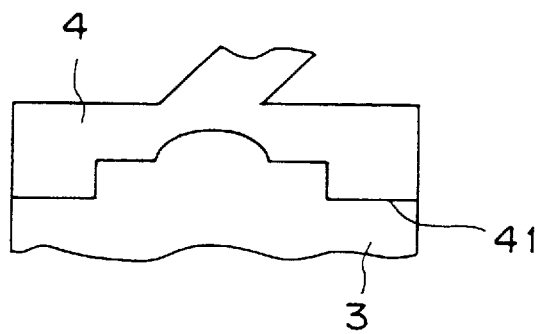
FIG. 29 is a front view showing the variations of the lead conductor 4.
Figure 30:
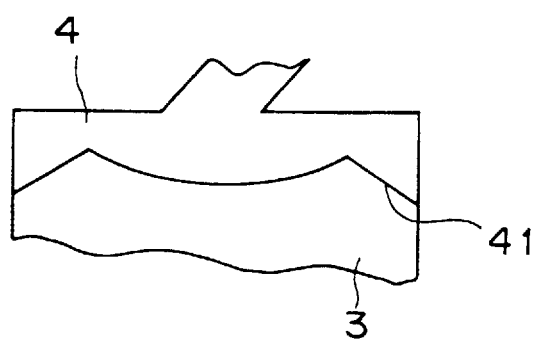
FIG. 30 is a front view showing the variations of the lead conductor 4.
Figure 31:
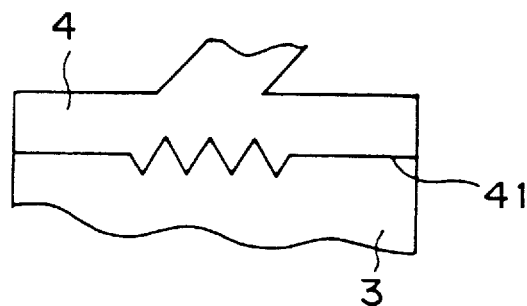
FIG. 31 is a front view showing the variations of the lead conductor 4.
Figure 32:
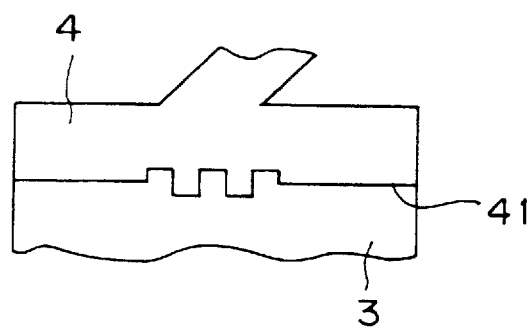
FIG. 32 is a front view showing the variations of the lead conductor 4.
Figure 33:
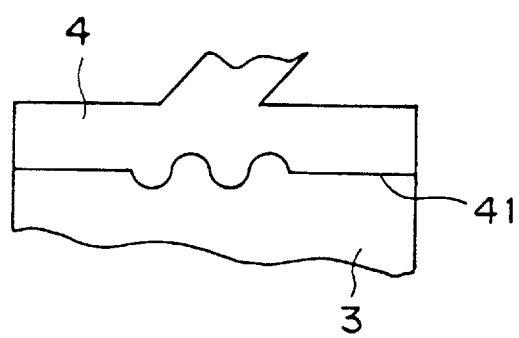
FIG. 33 is a front view showing the variations of the lead conductor 4.
Figure 34:
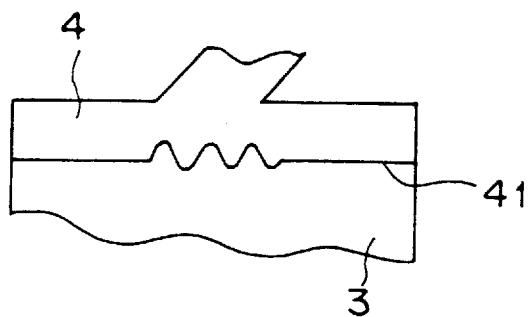
FIG. 34 is a front view showing the variations of the lead conductor 4.
Figure 35:
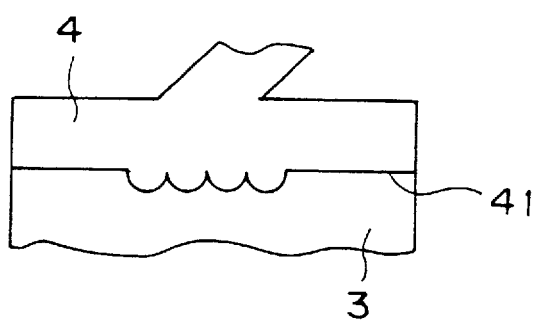
FIG. 35 is a front view showing the variations of the lead conductor 4.
Figure 36:
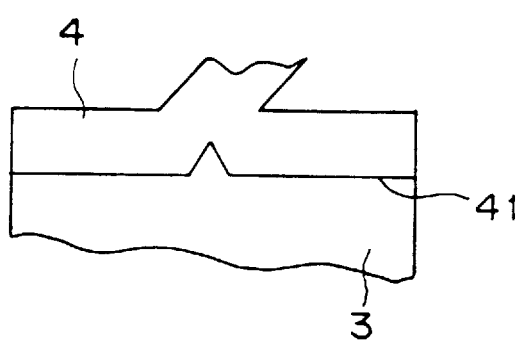
FIG. 36 is a front view showing the variations of the lead conductor 4.
Figure 37:
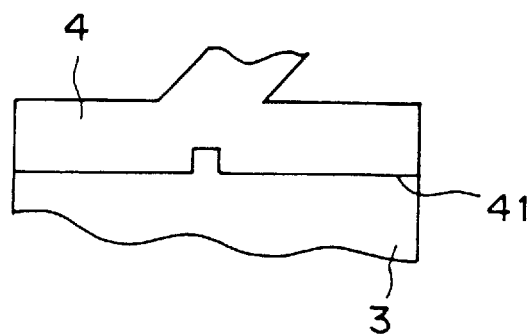
FIG. 37 is a front view showing the variations of the lead conductor 4.
Figure 38:
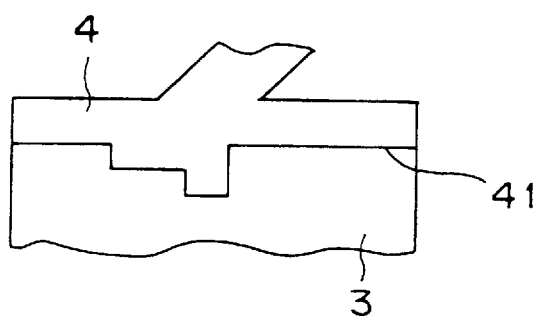
FIG. 38 is a front view showing the variations of the lead conductor 4.
Figure 39:
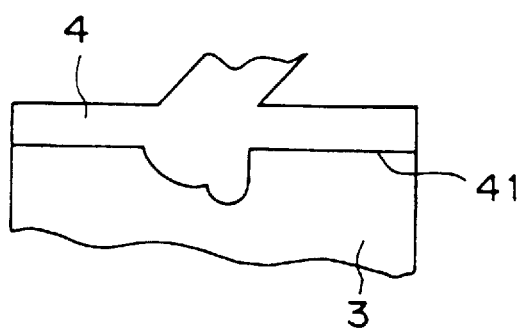
FIG. 39 is a front view showing the variations of the lead conductor 4.

FIG. 6 through 8 show alternately inverted triangular, square, and round waves respectively. FIG. 9 shows consecutive arcs in the same direction, and FIG. 10 shows inverted arcs from the arcs shown in FIG. 9. These shapes also ensure the effects obtained by the above described embodiment. That is, in all these cases, the shapes of the lower edges of the end portions do not match the crack development direction and the lower edge of the end portion becomes long enough to reduce the concentration of the stresses, thereby realizing the effects shown in FIG. 3. The shapes of the concave portions do not always have to be the same as those of the convex portions. For example, the shapes shown in these drawings can be used in combination. Additionally, the concave and convex portions should be used in combination, but do not have to be combined alternately. For example, a series of concave portions can be followed by a convex portion as shown in FIG. 11. As long as the concave and convex portions are used in combination, all shapes are allowed.

The lower edge 41 of the lead conductor 4 can be formed by a combination of one concave or convex portion and one or more of the other portions. For example, the shapes shown in FIGS. 12 through 30 are applied. Obviously, any other concave and convex applications can be allowed.

Furthermore, the lower edge 41 of the lead conductor 4 can be designed by applying the above described combination of concave and convex portions to the shortest line (horizontal line according to the present embodiment) between both sides of the joint portion 4a of the lead conductor 4 (for example, FIGS. 31 through 35). Otherwise, one of the concave or convex portions can be combined with a plurality of the other (for example, FIGS. 36 through 39).

Figure 40:
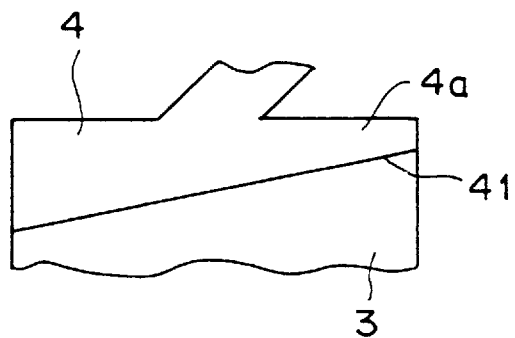
FIG. 40 is a front view showing the variations of the lead conductor 4.

The lower edge 41 of the lead conductor 4 is inclined to the shortest line (horizontal line according to the present embodiment) between both sides of the joint portion 4a of the lead conductor 4 as shown in FIG. 40, and can be longer than the shortest line. In this case, the on-line area 31 is a straight line. Accordingly, one of the above described effects, that is, the on-line area 31 should not match the crack development direction, cannot be obtained. However, the on-line area 31 itself is long enough to reduce the further development of a crack even if it arises. Other effects shown in FIG. 3 can be likewise obtained.

Figure 41:
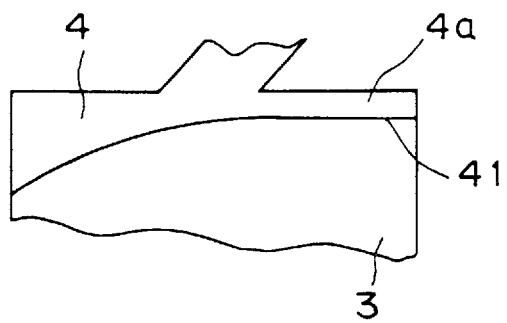
FIG. 41 is a front view showing the variations of the lead conductor 4.

If the lower edge 41 is longer than the shortest line, it does not necessarily have to be a straight line as shown in FIG. 40, but can as a curve be shown in FIG. 41.

The above described seam welding can be replaced with resistance welding, arc welding, laser welding, etc.

The electrode set 2 is not limited to the laminated type, and can be any other application. For example, long positive and negative plates can be folded into an appropriate size, or a roll of the electrode set can be stored in a cylindrical battery container.

The above described configuration of the welded portion between the lead conductor 4 and negative plate 3 can be applied to the welded portion between the lead conductor 5 and positive plate 9.

In the above described embodiment, the negative plate is a porous foam nickel sheet which is filled with hydrogen-occluding alloy powder and then compressed. The positive plate is a porous foam nickel sheet which is filled with nickel hydroxide powder and then compressed. The lead conductor is made of copper metallized with nickel. However, these units are not limited to the above listed materials, but can be made of any other materials as long as the battery properly functions, and the negative and positive plates can be individually welded onto the lead conductor. Furthermore, the battery is not limited to a nickel-hydrogen battery, but can be other types.

Figure 42:
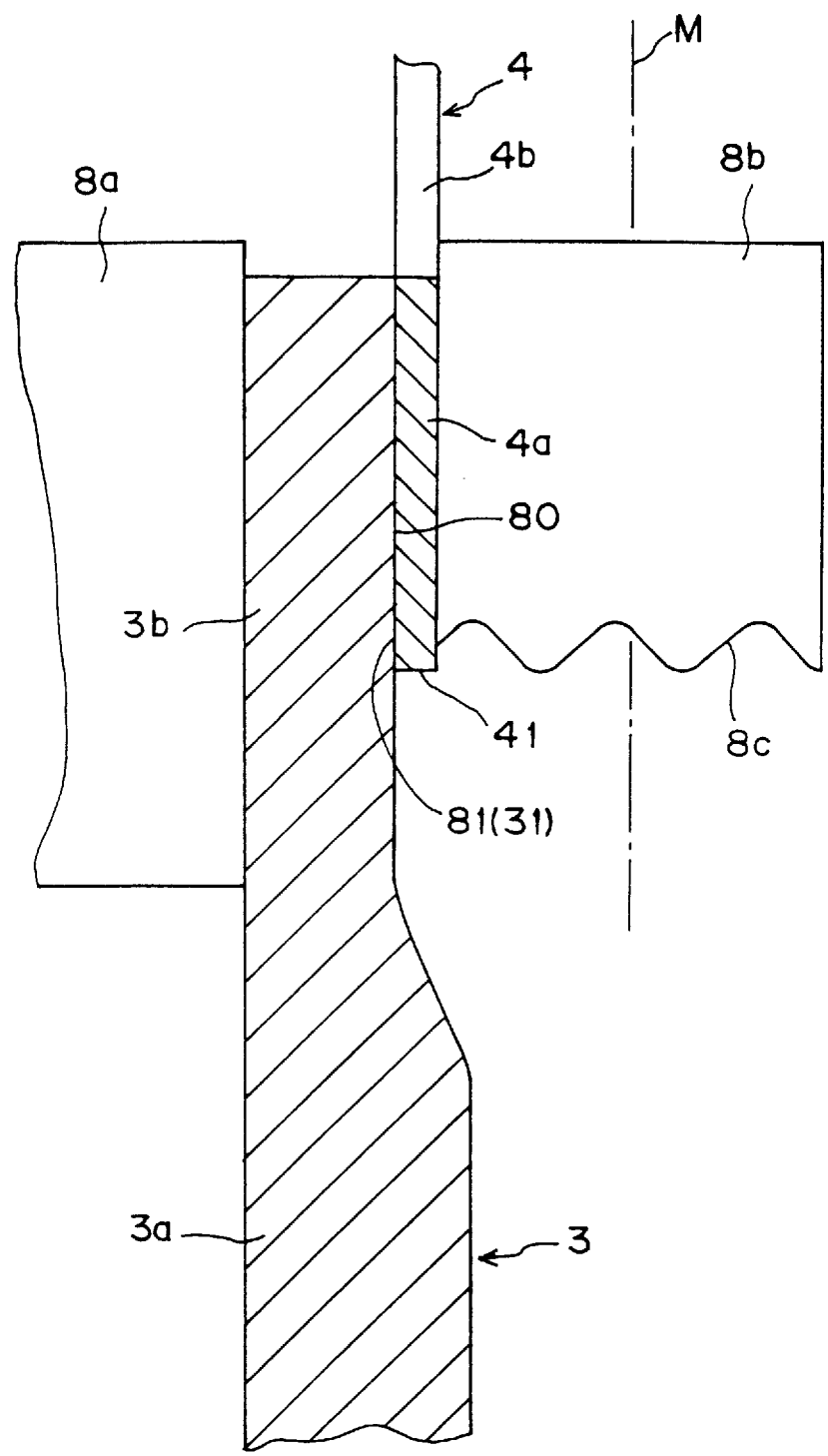
FIG. 42 is an enlarged sectional view showing the welded portion between the negative plate 3 and the lead conductor 4 according to another embodiment.

FIG. 42 shows another embodiment of the present invention. According to the present embodiment, a lower edge 8c of a roller 8b (of seam welding rollers 8a and 8b) is formed as waves of the lower edge 41 according to the embodiment shown in FIG. 3.

The seam welding using the rollers 8a and 8b makes the shape of an edge 81 of the welding of the welded area 80 follow the shape of the lower edge 8c of the roller 8a. The edge 81 is the edge of the end portion of the welded portion between the lead conductor and electrode plate.

According to the embodiment shown in FIG. 3, the on-line area 31 is the portion along the lower edge 41 of the joint portion 4a. According to the present embodiment of FIG. 42, the on-line area 31 is the portion along the welding edge 81 of the joint unit 4a, and the area from wavy welded edge 81 to the straight lower edge 41 is not welded. That is, it is not necessary to properly form-cut the lower edge 41 to obtain the required lengthening of the on-line area, thereby keeping costs down.

According to the present embodiment of FIG. 42, the various forms described relating to the embodiment by referring to FIG. 3 are all applicable.

Figure 43A:
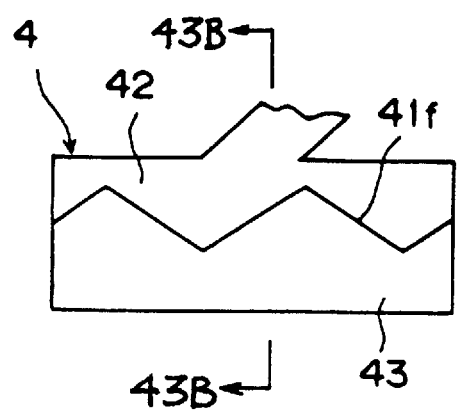
FIG. 43A is a front view showing a variation of the lead conductor 4 according to a further embodiment of the present invention.
Figure 43B:
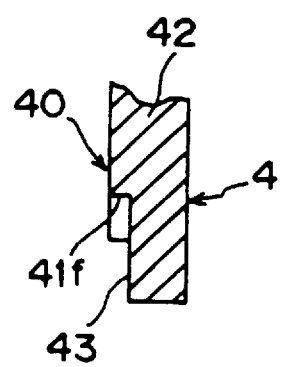
FIG. 43B is a sectional view showing the lead conductor 4 shown in FIG. 43A along the line 43B—43B.

FIGS. 43A and 43B show a further embodiment.

According to the present embodiment, the touching portion 40 of the lead conductor 4 facing and touching the negative plate 3 comprises a thick portion 42 and a thin portion 43. The shape of the boundary 41f between the thick portion 42 and thin portion 43 is the same as that of the lower edge 41 according to the embodiment shown in FIG. 3. With this configuration, an electric current is concentrated on the thick portion 42 during the welding operation, and the thin portion 43 is not welded. Therefore, the lower edge of the end portion of the welded area 80 (FIG. 42) is formed along the boundary 41f (FIG. 43A), and the above described effect can be provided. The boundary 41f can be formed in various shapes as listed above.

As described above, the present invention provides a battery capable of preventing or reducing a crack in the on-line area on the electrode plate along the edge of the end portion of the welded area between the lead conductor and electrode plate, or capable of preventing or reducing the development of the crack.

What is claimed is:

1. A method of producing a battery having a positive pole terminal and a negative pole terminal, comprising the steps of:

providing a roller, one end of which is shaped into a waveform;

welding a first lead conductor, for connection to the positive pole terminal, onto a positive electrode plate using the roller in a way that an edge of a welded area between the first lead conductor and the positive electrode plate indicates a waveform;

welding a second lead conductor, for connection to the negative pole terminal, onto a negative electrode plate using the roller in a way that the edge of the welded area between the second lead conductor and the negative electrode plate indicates a waveform;

storing in a battery container the positive and negative electrode plates to which the first and second lead conductors are welded, respectively;

welding onto the positive pole terminal the first lead conductor to which the positive electrode plate is welded;

welding onto the negative pole terminal the second lead conductor to which the negative electrode plate is welded; and sealing said battery container with a top cover.

2. A method of producing a battery having a positive pole terminal and a negative pole terminal, comprising the steps of:

forming at least two lead conductors, each having thick and thin portions a boundary between which is shaped in the form of a waveform;

welding a positive electrode plate onto a first lead conductor;

welding a negative electrode plate onto a second lead conductor;

storing in a battery container the positive and negative electrode plates to which the first and second lead conductors are welded, respectively;

welding onto the positive pole terminal the first lead conductor to which the positive electrode plate is welded;

welding onto the negative pole terminal the second lead conductor to which the negative electrode plate is welded; and sealing said battery container with a top cover.

3. A battery comprising:

an electrode plate having an upper end area portion including an elongated upper end edge extending between opposite sides of said electrode plate upper end area portion;

an electrode terminal;

a lead conductor plate having an upper end connected to said electrode terminal and a lower end area portion including an elongated lower end edge extending between opposite sides of said lower end area portion;

wherein said upper end area portion of the electrode plate and said lower end area portion of said lead conductor plate are seam-welded in face-to-face relation to each other, said seam-welded area portions providing an elongated weld edge on both of said lead conductor plate lower end area portion and said electrode plate upper end area portion and extending between said opposite sides of the upper end area portion of the electrode plate; and wherein one of said electrode plate elongated upper end edge, said elongated weld edges, and said lead conductor plate elongated lower end edge has a shaped length which is longer than the spacing between said opposite sides of said upper end area portion of the electrode plate.

4. A battery according to claim 3, wherein said elongated weld edge is intermediate said electrode plate elongated upper end edge and said lead conductor plate elongated lower end edge, and has said shaped length, said seam-welded area portions extending only between said elongated weld edge and one of said electrode plate elongated upper end edge and said lead conductor plate elongated lower end edge.

5. A battery according to claim 3, wherein said elongated weld edge coincides with said electrode plate elongated upper end edge, and said electrode plate elongated upper end edge has said shaped length.

6. A battery according to claim 3, wherein said elongated weld edge coincides with said lead conductor plate elongated lower end edge, and said lead conductor plate elongated lower end edge has said shaped length.

7. A battery according to claim 3, wherein said shaped length is a straight line which is angularly disposed with respect to the direction of said spacing distance between said opposite sides of said upper end area portion of the electrode plate.

8. A battery according to claim 3, wherein at least a portion of the length of said shaped length is curvilinearly concaved with respect to one of said electrode plate elongated upper end edge and said lead conductor plate elongated lower end edge.

9. A battery according to claim 3, wherein at least a portion of the length of said shaped length comprises curvilinearly concaved and convex length portions with respect to one of said electrode plate elongated upper end edge and said lead conductor plate elongated lower end edge.

10. A battery according to claim 3, wherein at least a portion of said shaped length comprises a plurality of intersecting angular straight line portions which alternate in direction with respect to the direction of said spacing distance between said opposite sides of said upper end area portion of the electrode plate.

11. A battery according to claim 3, wherein at least a portion of said shaped length comprises a plurality of alternately horizontal and vertical lengths providing a substantially rectangular patterned shaped length.

12. A battery according to claim 3, wherein said shaped length is irregularly shaped.

13. The battery according to claim 3, wherein said electrode plate comprises a positive plate and a negative plate mainly made of a porous material which is filled with a hydrogen-occluding alloy.

14. A battery comprising:

an electrode plate having an upper end area portion including an elongated upper end edge extending between opposite sides of said upper end area portion of the electrode plate;

an electrode terminal;

a lead conductor plate having an upper end connected to said electrode terminal and a lower end area portion, said lower end area portion comprising a thick portion and a thin portion which extends from the thick portion, wherein the thick and thin portions include first and second elongated lower end edges, respectively, and the first lower end edge extends between opposite sides of said thick portion of said first lower end area portion of said lead conductor plate;

wherein said upper end area portion of the electrode plate and said thick portion of said lower end area portion of said lead conductor plate are seam-welded in face-to-face relation to each other, said seam-welded area portions providing an elongated weld edge at both the thick portion of said lead conductor plate and on said electrode plate upper end area portion and extending between said opposite sides of said upper end area portion of the electrode plate; and wherein one of said electrode plate elongated upper edge, said elongated weld edges and said first elongated lower end edge has a shaped length which is longer than the spacing between said opposite sides of said upper end area portion of the electrode plate.

15. A method of producing a battery comprising the steps of:

providing an electrode plate having an upper end area portion including an elongated upper end edge extending between opposite sides of the upper end area portion of the electrode plate;

providing an electrode terminal;

providing a lead conductor plate having an upper end and a lower end area portion including an elongated lower end edge extending between opposite sides of said lower end area portion of the lead conductor plate;

connecting the electrode terminal to the upper end of the lead conductor plate; and welding a portion of said upper end area portion of said electrode plate to a portion of the lower end area portion of the lead conductor plate in face-to-face relation to each other to form an elongated weld edge on both of said lead conductor plate lower end area portion and said electrode plate upper end area portion and extending between said opposite sides of the upper end area portion of the electrode plate, wherein one of said electrode plate elongated upper end edge, said elongated weld edges and said lead conductor plate elongated lower end edge has a shaped length which is longer than the spacing between said opposite sides of said upper end area portion of the electrode plate.

16. The method of claim 15 further comprising the step of:

providing a weld roller iron having one shaped length edge, wherein the welding further comprises applying the weld roller at one of said elongated lower end edge of the lead conductor plate and said elongated upper end edge of the electrode plate to cause a portion of one of the lower end edge and the upper end edge to take the shape of the shaped length edge of the weld roller iron.

17. The method of claim 15 further comprising the step of:

providing a seam-weld iron having a shaped length edge which is longer than the spacing between said opposite sides of said upper end area portion of the electrode plate, wherein the welding further comprises applying the shaped length edge of the seam-weld iron at one of said elongated lower end edge of the lead conductor plate, said elongated weld edges and said elongated upper end edge of the electrode plate to cause the one seam-welded edge to take the shape of the shaped length edge of the seam-weld iron.

18. The method of claim 15 further comprising the step of:

providing a seam-weld iron having a shaped length edge which is longer than the spacing between said opposite sides of said upper end area portion of the electrode plate, wherein the welding further comprises applying the shaped length edge of the seam-weld iron on one of the electrode plate and the lead conductor plate and intermediate the elongated upper end edge of the electrode plate and the elongated lower end edge of the lead conductor plate to cause the one seam-welded edge to take the shape of the shaped length edge of the weld iron.

19. The method of claim 15, wherein said elongated upper end edge of said electrode plate is of a shaped length which is longer than the spacing between said opposite sides of said upper end area portion of the electrode plate.

20. The method of claim 15, wherein said elongated lower end edge of said lead conductor plate is of a shaped length which is longer than the spacing between said opposite sides of said upper end area portion of the electrode plate.

21. A battery comprising:

an electrode plate having an upper end area portion including an elongated upper end edge extending between opposite sides of said electrode plate upper end area portion;

an electrode terminal;

a lead conductor plate having an upper end connected to said electrode terminal and a lower end area portion including an elongated lower end edge extending between opposite sides of said lower end area portion;

wherein said upper end area portion of the electrode plate and said lower end area portion of said lead conductor plate are seam-welded in face-to-face relation to each other, said seamwelded area portions providing an elongated weld edge on both of said lead conductor plate lower end area portion and said electrode plate upper end area portion and extending between said opposite sides of the upper end area portion of the electrode plate;

wherein one of said electrode plate elongated upper end edge, said elongated weld edges and said lead conductor plate elongated lower end edge has a shaped length which is longer than the spacing between said opposite sides of said upper end area portion of the electrode plate; and wherein at least a portion of the length of said shaped length comprises curvilinearly concaved and convex length portions with respect to one of said electrode plate elongated upper end edge and said lead conductor plate elongated lower end edge.

* * * * *

UNITED STATES PATENT AND TRADEMARK OFFICE

CERTIFICATE OF CORRECTION

PATENT NO. : 5,770,334

DATED : June 23, 1998

INVENTOR(S) : KAWAI et al.

It is certified that error appears in the above-identified patent and that said Letters Patent is hereby corrected as shown below:

Column 6, line 6, after the semi-colon (;) insert - -the--; same line, after " sheet-form" delete " the" .

Column 7, line 9, change " FcosO" to --Fcos$\theta$--.

Column 8, line 9, should be rewritten to read: --40, but car be a curve as shown in FIG. 41.--;

lines 55-56, change " by referring to" to - -of- -.

Signed and Sealed this

Twenty-seventh Day of April, 1999

Attest:

Q. TODD DICKINSON

*Attesting Officer*   *Acting Commissioner of Patents and Trademarks*